United States Patent
Zhao et al.

(10) Patent No.: US 12,260,637 B1
(45) Date of Patent: Mar. 25, 2025

(54) CLASSIFICATION METHOD AND SYSTEM OF UAV HYPERSPECTRAL VEGETATION SPECIES BASED ON DEEP LEARNING

(71) Applicant: Institute of Mountain Hazards and Environment, Chinese Academy of Sciences, Chengdu (CN)

(72) Inventors: Hui Zhao, Chengdu (CN); Jundi Wang, Chengdu (CN); Xiaodan Wang, Chengdu (CN); Da Wei, Chengdu (CN); Yaohua Luo, Chengdu (CN)

(73) Assignee: Institute of Mountain Hazards and Environment, Chinese Academy of Sciences, Chengdu (CN)

( * ) Notice: Subject to any disclaimer, the term of this patent is extended or adjusted under 35 U.S.C. 154(b) by 0 days.

(21) Appl. No.: 18/640,627

(22) Filed: Apr. 19, 2024

(30) Foreign Application Priority Data

Jan. 25, 2024 (CN) .................. 202410104064.X

(51) Int. Cl.
*G06K 9/00* (2022.01)
*G06V 10/10* (2022.01)
(Continued)

(52) U.S. Cl.
CPC ............ *G06V 20/188* (2022.01); *G06V 10/16* (2022.01); *G06V 10/20* (2022.01); *G06V 10/58* (2022.01);
(Continued)

(58) Field of Classification Search
CPC .... G06V 20/188; G06V 20/17; G06V 20/194; G06V 20/70; G06V 10/20; G06V 10/58; G06V 10/16; G06V 10/774; G06V 10/764
See application file for complete search history.

(56) References Cited

U.S. PATENT DOCUMENTS

| | | | | |
|---|---|---|---|---|
| 11,869,192 B2 * | 1/2024 | Yousefhussien | ..... | G06V 20/188 |
| 2010/0040260 A1 * | 2/2010 | Kelle | .................. | G06V 20/188 |
| | | | | 382/110 |

FOREIGN PATENT DOCUMENTS

| | | |
|---|---|---|
| CN | 110096997 A | 8/2019 |
| CN | 111062265 A | 4/2020 |

(Continued)

OTHER PUBLICATIONS

Oghaz, M. M. D., Razaak, M., Kerdegari, H., Argyriou, V., & Remagnino, P. (May 2019). Scene and environment monitoring using aerial imagery and deep learning. In 2019 15th International Conference on Distributed Computing in Sensor Systems (DCOSS) (pp. 362-369). IEEE. (Year: 2019).*

(Continued)

*Primary Examiner* — Michael J Vanchy, Jr.
(74) *Attorney, Agent, or Firm* — Pilloff Passino & Cosenza LLP; Rachel Pilloff; Sean Passino

(57) ABSTRACT

The application discloses a classification method and a system of UAV hyperspectral vegetation species based on a deep learning, where the method includes the following steps: collecting hyperspectral images by a UAV; preprocessing collected hyperspectral images to obtain preprocessed images, and performing a stitching mosaicking preprocessing on the preprocessed images to obtain hyperspectral orthoimages; labeling the hyperspectral orthoimages to obtain a label data set; performing a vegetation index fusion on the hyperspectral orthoimages to obtain vegetation index-hyperspectral orthoimages; constructing a grassland vegetation classification model based on the vegetation index-hyperspectral orthoimages and the label data set, and completing a vegetation species classification by using the grassland vegetation classification model.

4 Claims, 10 Drawing Sheets

(51) Int. Cl.
  *G06V 10/20* (2022.01)
  *G06V 10/58* (2022.01)
  *G06V 10/764* (2022.01)
  *G06V 10/774* (2022.01)
  *G06V 20/10* (2022.01)
  *G06V 20/17* (2022.01)
  *G06V 20/70* (2022.01)

(52) U.S. Cl.
  CPC .......... *G06V 10/764* (2022.01); *G06V 10/774* (2022.01); *G06V 20/17* (2022.01); *G06V 20/194* (2022.01); *G06V 20/70* (2022.01)

(56) References Cited

FOREIGN PATENT DOCUMENTS

| CN | 112016388 A | 12/2020 |
|---|---|---|
| CN | 114241331 A | 3/2022 |
| CN | 115830441 A | 3/2023 |
| CN | 116340838 A | 6/2023 |
| CN | 116503590 A | 7/2023 |
| CN | 116704332 A | 9/2023 |

OTHER PUBLICATIONS

Yunhao Gao, et al., "Fusion Classification of HSI and MSI Using a Spatial-Spectral Vision Transformer for Wetland Biodiversity Estimation" Remote Sens. Date of issue: Feb. 11, 2022. 2022, vol. 14(4), 850; pp. 1-19; doi: 10.3390/rs14040850 Claims involved: 1-8.

First search report dated Aug. 15, 2024 in SIPO application No. 202410104064.X.

Supplementary search report dated Sep. 25, 2024 in SIPO application No. 202410104064.X.

Notification to Grant Patent Right for Invention dated Sep. 30, 2024 in SIPO application No. 202410104064.X.

Office action dated Aug. 17, 2024 in SIPO application No. 202410104064.X.

* cited by examiner

CLASSIFICATION METHOD AND SYSTEM OF UAV HYPERSPECTRAL VEGETATION SPECIES BASED ON DEEP LEARNING

CROSS-REFERENCE TO RELATED APPLICATIONS

This application claims priority to Chinese Patent Application No. 202410104064.X, filed on Jan. 25, 2024, the contents of which are hereby incorporated by reference.

TECHNICAL FIELD

The application relates to the field of unmanned aerial vehicle (UAV) hyperspectral image processing, and in particular to a classification method and a system of UAV hyperspectral vegetation species based on a deep learning.

BACKGROUND

Grassland ecosystem is one of the largest and most widely distributed ecosystems in terrestrial ecosystems, accounting for about 40% of the earth's surface area. However, in recent decades, half of the world's grasslands have been degraded due to human and natural factors. Accurate quantitative evaluation of grassland degradation is the basis of grassland protection and rational utilization in fragile grassland ecological environment. At present, there is an urgent need for a dynamic monitoring method to understand the overall spatial distribution of grassland ecosystem degradation.

Grassland degradation is often accompanied by the reduction or even disappearance of the number of constructive species and dominant species, and the vegetation types and community structure characteristics of grassland often change obviously. In the monitoring of grassland degradation, it is difficult to obtain the overall situation of grassland degradation on the regional scale by the field quadrat survey method, and the classification method of grassland degradation species based on conventional remote sensing may not accurately reflect the species composition of vegetation. UAV remote sensing has the characteristics of low operating cost, high flexibility, high resolution and real-time data acquisition. Hyperspectral images have the characteristics of high spectral resolution and continuous bands, and airborne hyperspectral data has become an important data source for remote sensing monitoring. However, the UAV hyperspectral images still face the following challenges in fine classification of various grassland species. On the one hand, the spectral information of different grass species is similar, and the difference between species is small, and on the other hand, with the improvement of the spatial resolution of UAV hyperspectral images, the spatial heterogeneity of ground objects gradually increases, which further intensifies the spectral variability of ground objects and increases the intra-class variance of similar grass species. In addition, because of the ultra-high spectral resolution and spatial resolution, the data of UAV hyperspectral images are massive and high-dimensional, so an efficient, accurate and stable data processing method is needed.

At present, hyperspectral remote sensing image classification methods mainly include conventional machine learning classification method and deep learning classification method. The conventional machine learning method relies on the manual feature design of expert knowledge, which is difficult to be applied to the hyperspectral images of UAV with massive and high-dimensional nonlinear data structures. Compared with machine learning method, deep learning may automatically learn and extract abstract and discriminating deep semantic information from images by constructing multi-layer network model and using massive training data, which reduces the dependence on expert knowledge, thus improving the accuracy and efficiency of classification. At present, convolutional neural network and vision Transformer have been widely used in remote sensing image analysis. Convolutional neural network is mainly divided into spatial blocks, and the 3D spatial blocks in the neighborhood are selected as the input of the network with the labeled pixels as the center. This strategy may only use local "space spectrum" information, and it is difficult to establish long-distance dependence. The vision Transformer model completely abandons convolution operation and adopts pure attention mechanism to capture the dependencies in different regions of the input data in a large spatial range. Although the vision Transformer network solves the problem of long-distance dependence of spectral features, it fails to capture the local spatial spectral fusion information well.

SUMMARY

In order to solve the technical problems in the above background, the application completely uses the vegetation index-mobile 3D atrous convolution vision Transformer model to carry out the grassland vegetation species classification processing flow of the UAV hyperspectral images on the community scale.

In order to achieve the above objectives, the application provides a classification method of UAV hyperspectral vegetation species based on a deep learning, including the following steps:
  collecting hyperspectral images of vegetations by a UAV;
  preprocessing collected hyperspectral images to obtain preprocessed images, and performing a stitching mosaicking preprocessing on the preprocessed images to obtain hyperspectral orthoimages;
  labeling the hyperspectral orthoimages to obtain a label data set;
  performing a vegetation index fusion on the hyperspectral orthoimages to obtain vegetation index-hyperspectral orthoimages; and
  constructing a grassland vegetation classification model based on the vegetation index-hyperspectral orthoimages and the label data set, and completing a vegetation species classification by using the grassland vegetation classification model.

Optionally, a preprocessing method includes a lens calibration, a reflectivity calibration and an atmospheric calibration.

Optionally, a method for obtaining the hyperspectral orthoimages includes: importing the preprocessed images into a mosaic software, inputting a flying height of a UAV when obtaining images, and manually eliminating abnormal images; then setting stitching parameters and previewing an effect until stitching results reach an expectation; finally, performing a full-band stitching mosaicking of the images to generate the hyperspectral orthoimages of a research area.

Optionally, a method for obtaining the label data set includes following steps: firstly, importing the hyperspectral orthoimages into a label labeling software, extracting spectral features of the hyperspectral orthoimages, and performing an artificial visual interpretation according to the spectral features of different vegetation species in the label labeling software and labeling different vegetation species to obtain region of interest of each of the vegetation species in the images; then, a region of interest of each of the vegetation species in the images; then, a labeled region of interest is converted into a label grid file; finally, after the label grid file is obtained, dividing the label grid file into a training set and a test set.

Optionally, a method for obtaining the vegetation index-hyperspectral orthoimages includes: firstly, selecting infrared and near-infrared bands for the hyperspectral orthoimages, and then calculating a normalized differential vegetation index value, a difference vegetation index value and a ratio vegetation index value for the hyperspectral orthoimage according to selected infrared and near-infrared bands to obtain corresponding grid images; then, fusing obtained grid images into bands of the hyperspectral orthoimages in the form of band, and obtaining the vegetation index-hyperspectral orthoimages.

Optionally, the vegetation classification model includes a mobile 3D atrous convolution vision Transformer model, and the mobile 3D atrous convolution vision Transformer model has a multi-level structure design and includes three stages and five modules, including a 3D convolution, a 3D atrous convolution, a mobile convolution vision Transformer, a reverse residual structure and a convolution vision Transformer; where stage 1 includes a 3D convolution, a 3D atrous convolution and a mobile convolution vision Transformer module, stage 2 includes a 3D atrous convolution and mobile convolution vision Transformer module, and stage 3 includes a reverse residual structure and a convolution vision Transformer module.

The application also provides a classification system of UAV hyperspectral vegetation species based on a deep learning, used to realize the method above, including an acquisition module, a stitching module, a labeling module, a fusion module and a construction module;

the acquisition module is used for obtaining hyperspectral images by using the UAV;

the stitching module is used for performing a preprocessing and a stitching mosaicking on the hyperspectral images to obtain hyperspectral orthoimages;

the labeling module is used for labeling the hyperspectral orthoimages to obtain a label data set;

the fusion module is used for performing a vegetation index fusion on the hyperspectral orthoimages to obtain vegetation index-hyperspectral orthoimages; and the construction module is used for constructing a grassland vegetation classification model based on the vegetation index-hyperspectral orthoimages and the label data set, and completing a vegetation species classification by using the grassland vegetation classification model.

Optionally, the grassland vegetation classification model includes a mobile 3D atrous convolution vision Transformer model, and the mobile 3D atrous convolution vision Transformer model has a multi-level structure design and includes three stages and five modules, including a 3D convolution, a 3D atrous convolution, a mobile convolution vision Transformer, a reverse residual structure and a convolution vision Transformer; where stage 1 includes a 3D convolution, a 3D atrous convolution and a mobile convolution vision Transformer module, stage 2 includes a 3D atrous convolution and mobile convolution vision Transformer module, and stage 3 includes a reverse residual structure and a convolution vision Transformer module.

Compared with the prior art, the application has the following beneficial effects.

Firstly, compared with the conventional convolution layer, the 3D atrous convolution layer may reduce the loss of data features, expand the receptive field of the convolution layer, solve the problem of joint extraction of information of two bands which are far away from each other in hyperspectral images, learn more "space spectrum" features, and improve the final classification accuracy; the fusion architecture fusing 3D convolution and vision Transformer, may realize global "space spectrum" information fusion, and compared with vision Transformer and 3D convolution neural network, the reasoning speed and accuracy have been greatly improved, and excellent performance may be achieved while maintaining computational efficiency.

Secondly, a vegetation index-feature extraction module is designed. The black box characteristics of the existing deep learning algorithm based on hyperspectral vegetation classification make it difficult to explain the ecological significance of vegetation in the image, and the spectral layers of various vegetation in the image are highly correlated, and the spectral features of distinguishing vegetation types are weak. This module may enhance the characteristic spectral information between vegetation and improve the ability to distinguish vegetation species.

BRIEF DESCRIPTION OF THE DRAWINGS

In order to explain the technical scheme of the present application more clearly, the drawings needed in the embodiments are briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

Figure 1:
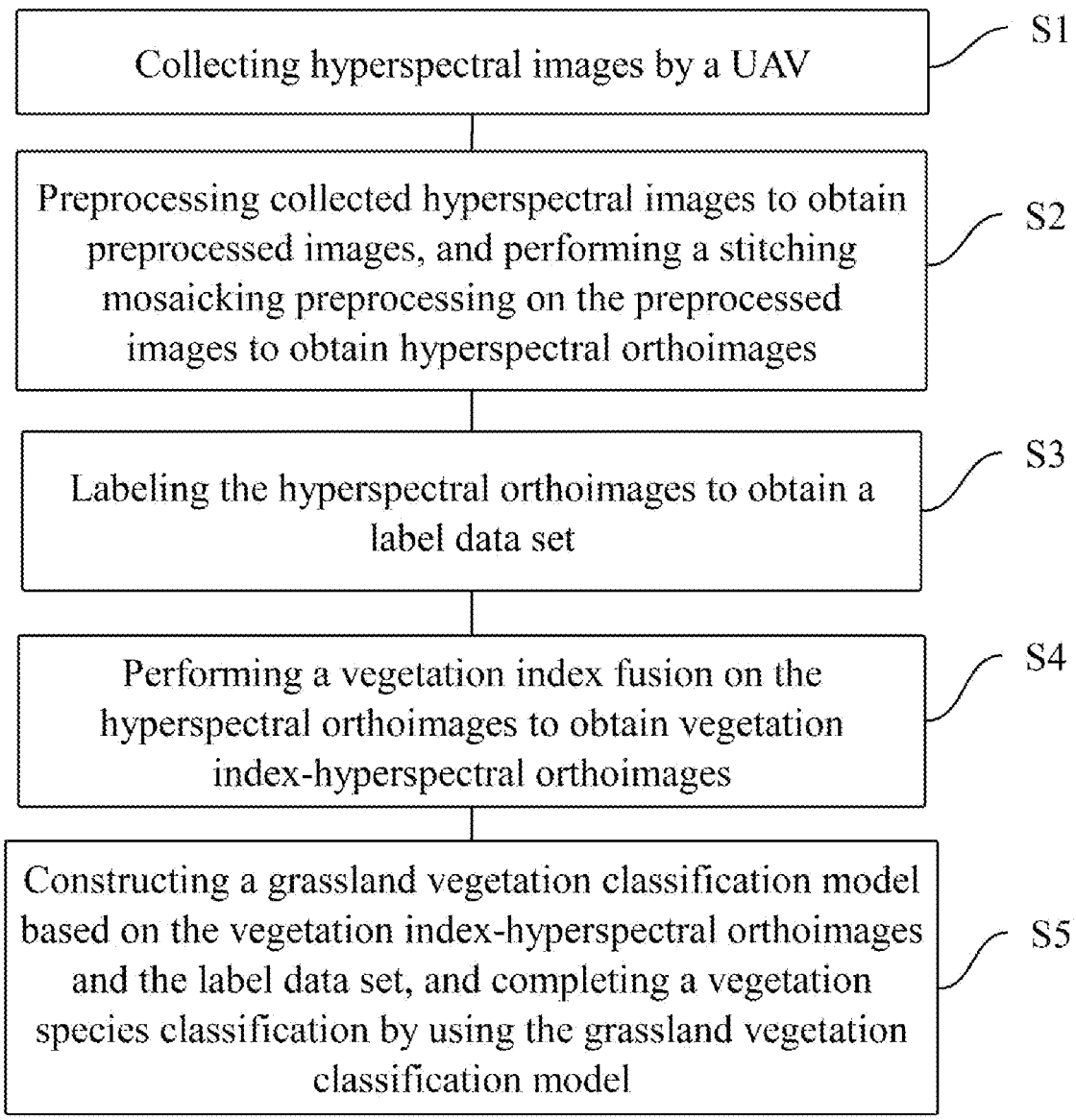
FIG. 1 is a schematic flow diagram of a method according to an embodiment of the present application.

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

In order to make the above objects, features and advantages of the present application more obvious and easy to understand, the present application will be further described in detail with the attached drawings and specific embodiments.

Before the explanation, firstly the disadvantages of the current technology are introduced.

(1) Disadvantages of quadrat field survey method: conventional grassland vegetation research mostly adopts a field quadrat survey method, which has the disadvantages of laborious, high cost and long data collection period.

Causes: the field quadrat survey method needs to spend a lot of time, manpower and financial resources to investigate the wild grassland vegetation, including the composition of quadrat vegetation, the height of various types of vegetation, the coverage of various types of vegetation, and the collection of visible light images of vegetation canopy. It is difficult to make a detailed survey of an area in a short period of time, and it is even more difficult to obtain data in remote areas with inconvenient transportation and areas with high altitude that are difficult for people to reach.

(2) Disadvantages of conventional satellite remote sensing technology: it is difficult for conventional satellite remote sensing technology to distinguish different types of grassland vegetation.

Causes: due to the limitation of spatial resolution and spectral resolution, conventional satellite remote sensing technology may only monitor large-scale vegetation communities, and it is difficult to describe the growth of vegetation species in small-scale sample plots and obtain real-time data. Moreover, the characteristics of low, fine and mixed growth of grassland vegetation structure make it limited in grassland plant species identification.

(3) Disadvantages of conventional hyperspectral image classification algorithm: machine learning classification, such as support vector machine, k-nearest neighbors, naive Bayes, decision tree and extreme learning machine, which were applied to hyperspectral image classification in the early stage, are all based on spectral features of hyperspectral images, and the spatial information of vegetation types in hyperspectral images is not considered, so the classification effect is not ideal. Although the deep learning method has made good achievements in hyperspectral image classification, the conventional UAV hyperspectral image classification method based on deep learning still has some defects in fine classification of grassland vegetation.

Causes: the conventional hyperspectral classification algorithm adopts the research paradigm of "model-driven", but the manually designed features and models may only express the simple features such as shape, texture and spectrum of ground objects, without more abstract semantic information, and are influenced by the high-dimensional nonlinearity of hyperspectral data and "different objects same image and different object with same spectrum", so it is difficult for the conventional hyperspectral interpretation algorithm to extract the grassland vegetation features with complex population structure. Conventional hyperspectral image classification methods based on deep learning are mainly based on convolution neural network, and convolution neural network usually selects the 3D space blocks in the neighborhood as the input of the network. This strategy may only use local "space spectrum" information, which eventually leads to unsatisfactory classification results.

Embodiment 1

In order to solve the above problems, this embodiment provides a classification method of UAV hyperspectral vegetation species based on a deep learning, as shown in FIG. 1, including the following steps:

S1, hyperspectral images of vegetations in the sample area are collected by using UAVs. In this embodiment, hyperspectral image data is collected by a UAV equipped with a hyperspectral camera. In this embodiment, the UAV is DJI UAV M600 PRO, which is an electric six-rotor aircraft powered by six detachable batteries. The maximum load is 6 kg, the maximum durability under this load is about 16 min, and the maximum flight speed is 65 km/h. The hyperspectral camera is a push-broom hyperspectral imager (Gaiasky-mini2-vn), and spectral wavelength range is 400-1,000 nm, spectral resolution is 3.5 nm, and the number of spectral channels is 176. The focal length of the lens is 23 mm, the transverse field of view angle is 21.5°, and the total weight is 1.5 kg. The spatial dimension of each acquired image is 960 pixels×1040 pixels, and the image format is .raw, and each image is capable of being used directly.

According to the vegetation growth and climate characteristics of alpine grassland in the study area, data are collected. Firstly, the hyperspectral data of UAV is collected. 10:00-14:00 is chose, and when there is no wind to breeze, clear and cloudless, or when the cloud amount is less than 2%, so as to ensure sufficient illumination during the collection period and few shadows in the collected aerial photos. Before obtaining UAV image data, multiple ground control points are set up, and each ground control point will be placed with a 40 cm×60 cm positioning signboard for subsequent ground data investigation, which may accurately locate on airborne hyperspectral images. A 1 m×1 m vegetation ground survey quadrat is set near each ground control point. Before and after each flight, the imaging spectrometer is calibrated by the standard plate to measure the correct exposure value. Based on the accurate extraction of community species on the scale of quadrat, the design of flying height and sample area size may consider the battery life of UAV, PTZ and hyperspectral instrument at the same time. The flying height of the UAV is set to 50 m, the quadrat size is 50×50 m, the image heading overlap rate and lateral overlap rate are set to 80% and 75% respectively, and the spatial resolution of the obtained remote sensing image is about 1.0-1.5 cm.

S2, the collected hyperspectral images are preprocessed to obtain preprocessed images, and full-band stitching mosaicking processing is performed on the preprocessed images to obtain hyperspectral orthoimages.

Figure 2:
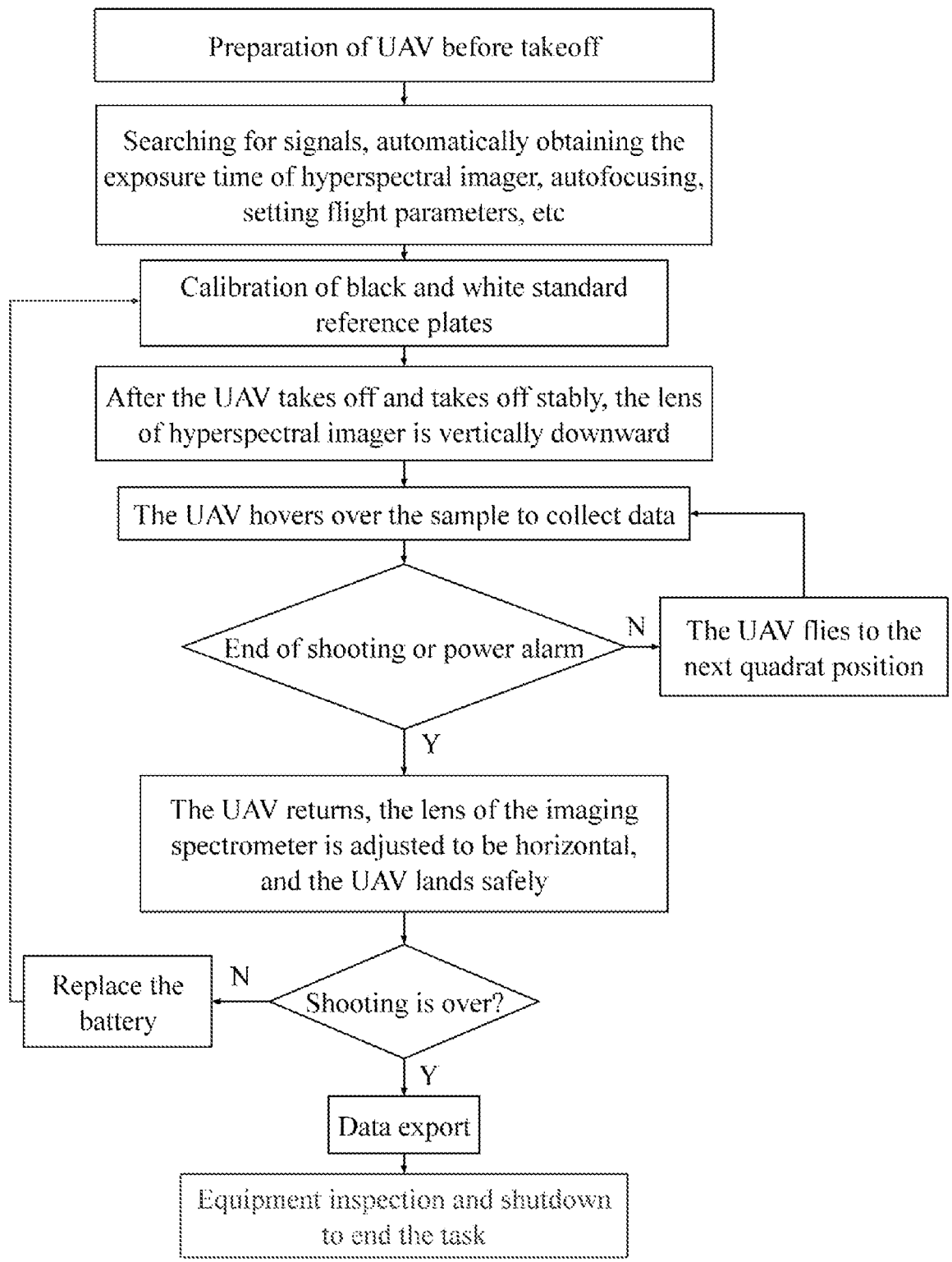
FIG. 2 is a schematic flow chart of hyperspectral data acquisition of the UAV according to an embodiment of the present application.

Firstly, the airborne hyperspectral remote sensing images are preprocessed, including lens calibration, reflectivity calibration and atmospheric calibration, and the preprocessed single-scene hyperspectral images are obtained. Lens calibration: the original data is calibrated by selecting background data and correction data to eliminate or reduce lens distortion and make up for common lens optical defects; reflectivity calibration: through the calibration of dark background and whiteboard data taken before the flight of the UAV, burrs caused by many noises (instrument noise, environmental noise, etc.) in the response curve are eliminated; atmospheric calibration: the process of removing the influence of clouds and aerosols on data, and obtaining the true reflectivity of the surface. Standard gray cloth is used as the reference for atmospheric calibration, and 40% and 60% standard gray cloth close to the reflectivity of grassland vegetation are used. The overall collection process is shown in FIG. 2.

The preprocessed images are imported into mosaic software, the flying height (50 m) of the UAV is input when obtaining the images, and some abnormal images are eliminated; then the stitching parameters are set and the effect is previewed until the stitching result reaches the expectation. Finally, the positions of the imaged and full-band stitching mosaicking are corrected to generate the hyperspectral orthoimage of the research area.

S3, the hyperspectral orthoimages are labeled to obtain a label data set.

On the basis of ground investigation, combined with visual interpretation method, hyperspectral orthoimages are labeled. First, the UAV collects hyperspectral images and carries out field ground investigation, including recording the name of vegetation species, vegetation height and coverage in the quadrat, and shooting the visible light image of vegetation canopy with a camera. In this embodiment, *Stipa purpurea* Griseb., *Leontopodium pusillum* (Beauverd) Hand.-Mazz., *Artemisia nanschanica* Krasch. and *Carex moorcroftii* Falc. ex Boott are selected as the research objects. Secondly, the hyperspectral orthoimages are input into Envi software, and the spectral features of the hyperspectral orthoimage are extracted in Envi software, and the "region of interest (ROI)" of different grassland vegetation species is labeled by manual visual interpretation according to the spectral features of different vegetation species in Envi software to obtain the ROI of the image; then the labeled ROI is converted into a label grid file. After labeling, label data is divided into a training set and a test set.

In this embodiment, there are 61,587 data samples in the data set, including 21,251 *Stipa purpurea* Griseb., 5,254 *Artemisia nanschanica* Krasch., 14,985 *Leontopodium pusillum* (Beauverd) Hand.-Mazz., 1,889 *Carex moorcroftii* Falc. ex Boott, and 18,208 bare soil and others. Before the model training, 8,000 sample points are randomly selected from all pixels in all categories as the training set, and the remaining pixels are used as the test set. For categories with less than 8,000 sample points, half of the existing sample points are used as the training set, and the other half as the test set. There are 27,571 samples in the training set and 34,016 samples in the test set.

S4, vegetation index fusion is performed on the hyperspectral orthoimages.

Firstly, infrared and near-infrared bands of hyperspectral orthoimages are selected (infrared band is 650.8 nm and near-infrared band is 861.7 nm in this embodiment), and normalized differential vegetation index (NDVI) values, differential vegetation index (DVI) values and ratio vegetation index (RVI) values are calculated. The calculation formulas are shown in Table 1, and finally the corresponding grid images of NDVI, DVI and RVI are obtained.

TABLE 1

| Vegetation index types Calculation formulas | Calculation formulas |
| --- | --- |
| Normalized differential vegetation index (NDVI) | $\dfrac{\rho_{NIR} - \rho_{RED}}{\rho_{NIR} + \rho_{RED}}$ |
| Differential vegetation index (DVI) | $\rho_{NIR} + \rho_{RED}$ |
| Ratio vegetation index (RVI) | $\dfrac{\rho_{NIR}}{\rho_{RED}}$ |

In the table, $\rho_{RED}$ is the infrared band and $\rho_{NIR}$ is in the near-infrared band.

Figure 3A:
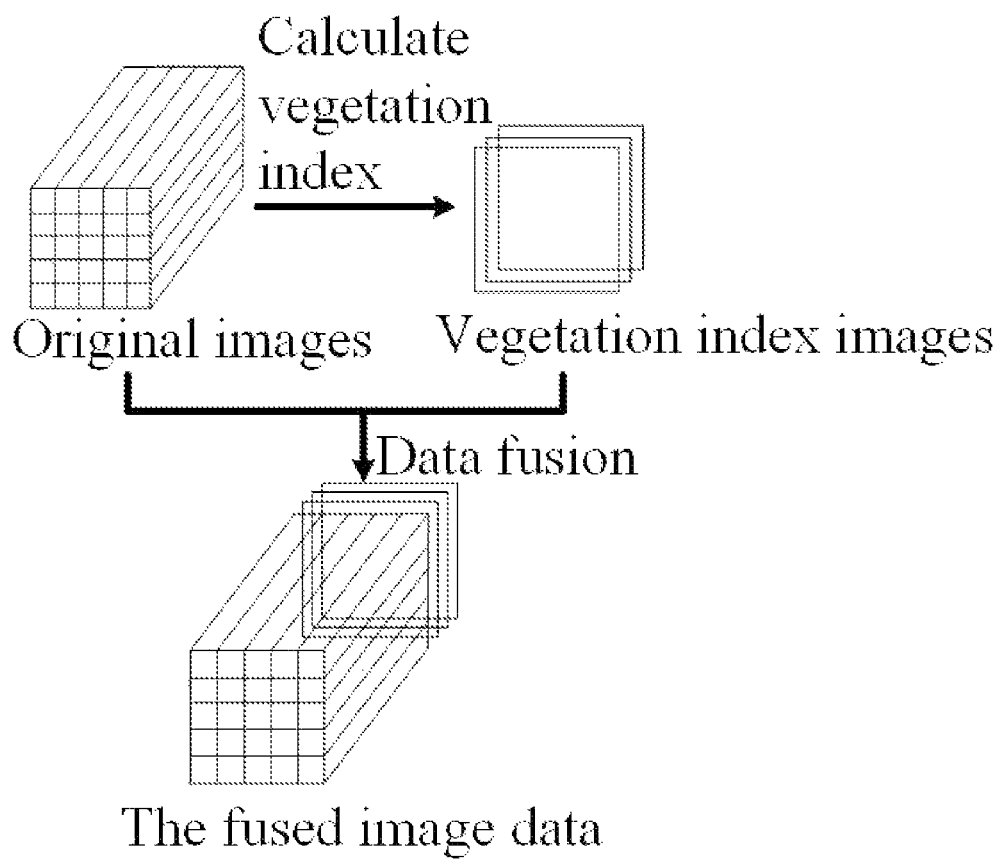
FIG. 3A shows the process of the vegetation index fusion of a schematic structural diagram of a grassland vegetation classification model according to an embodiment of the present application.

Then, the obtained grid data of NDVI, DVI and RVI are fused into the band of hyperspectral orthoimages, and the vegetation index-hyperspectral orthoimages is obtained. The fusion process is shown in FIG. 3A.

S5, a grassland vegetation classification model is constructed based on the vegetation index-hyperspectral orthoimages and the label data set, and the vegetation species classification is completed by using the grassland vegetation classification model.

Figure 3B:
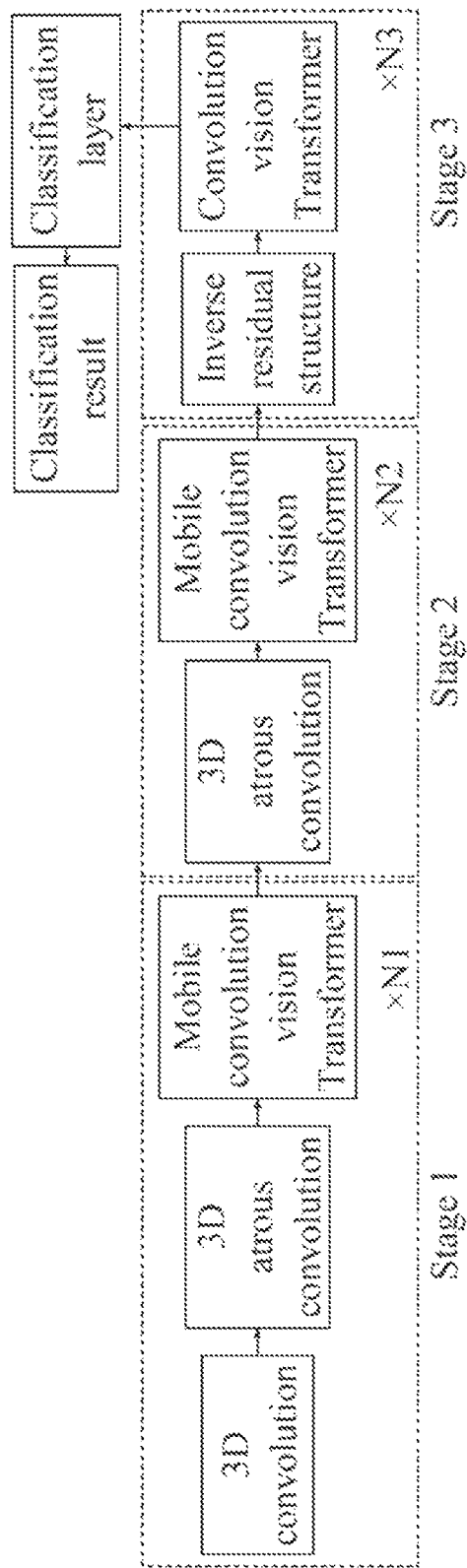
FIG. 3B shows the structure of a mobile 3D atrous convolution vision Transformer of a schematic structural diagram of a grassland vegetation classification model according to an embodiment of the present application.

In this embodiment, the grassland vegetation classification model is a mobile 3D atrous convolution vision Transformer, which draws lessons from the multi-level structure design of convolutional neural network, as shown in FIG. 3B, and the model is a multi-level hierarchical structure, which includes three stages and five modules, including: a 3D convolution, a 3D atrous convolution, a mobile convolution vision Transformer, a reverse residual structure and a convolution vision Transformer; where stage 1 includes a 3D convolution, a 3D atrous convolution and a mobile convolution vision Transformer module, stage 2 includes a 3D atrous convolution and mobile convolution vision Transformer module, and stage 3 includes a reverse residual structure and a convolution vision Transformer module.

Figure 4A:
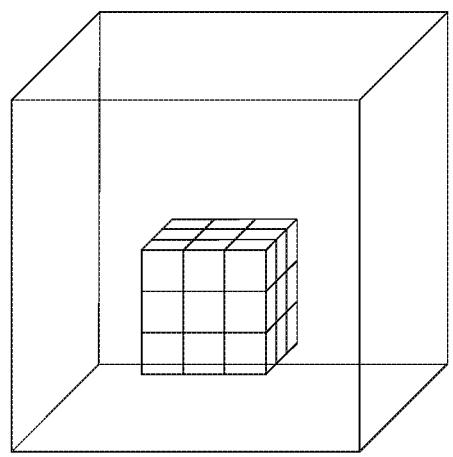
FIG. 4A is a 3D convolution structure according to an embodiment of the present application.

The specific steps of model construction include:

S501, the vegetation index-hyperspectral orthoimages obtained in the above steps and the label training set are input into the model for training. First, the input 3D Patches are downsampled through the 3D convolution in stage 1 in FIG. 3B, and the structure of the 3D convolution is shown in FIG. 4A.

Figure 4B:
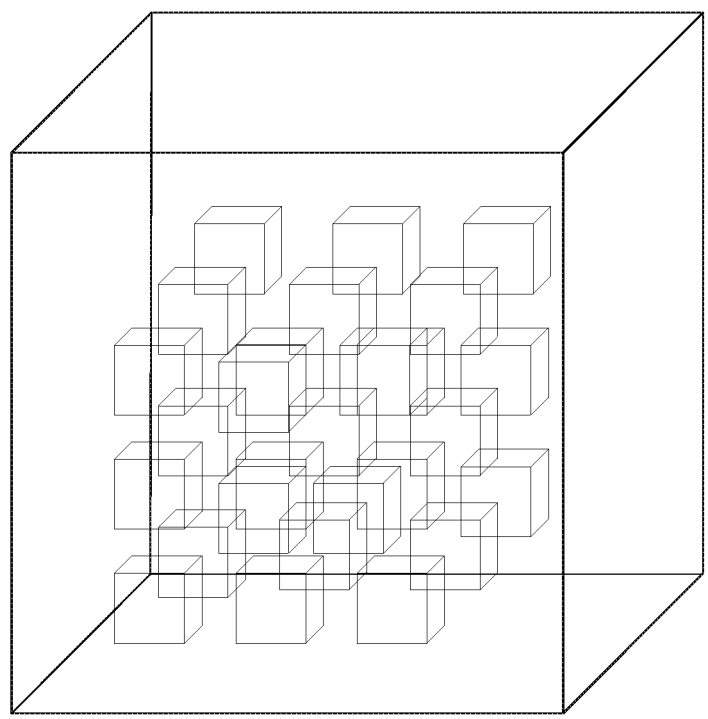
FIG. 4B is a 3D atrous convolution structure according to an embodiment of the present application.

After that, the results obtained by the 3D convolution operation are passed through the 3D atrous convolution layer, and the receptive field of the convolution kernel is expanded under the condition of retaining more information. The structure of the 3D atrous convolution layer is shown in FIG. 4B.

Figure 5:
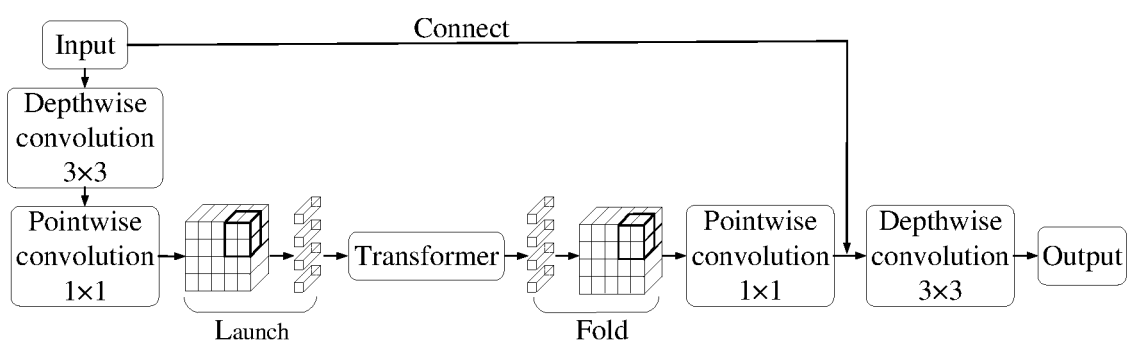
FIG. 5 is a schematic structural diagram of a mobile convolution vision Transformer module according to an embodiment of the present application.

Finally, the feature map obtained by 3D atrous convolution operation passes through N1 layer mobile convolution vision Transformer module (as shown in FIG. 5), aiming at accelerating the modeling of local and global information of input tensor. In the mobile convolution vision Transformer module, the ordinary 3D volume integral is decomposed into depth convolution and point convolution through depth separable convolution. The feature map is firstly used for local feature modeling through 3×3 depth convolution, then the tensor is projected into a high-dimensional space by using the linear combination of 1×1 point convolution learning input channels, and then the global long-distance dependent features are extracted through the Transformer module with the "expand-Transformer encoder-collapse" mechanism. This structure is helpful to reduce the number of parameters in the self-attention mechanism. Then the number of channels is adjusted back to the original size by 1×1 point convolution. Finally, with the help of shortcut residual difference branch, the feature map and the original input map are simply connected along the channel direction, and these features are fused by 3×3 depth convolution to obtain the final global feature output.

S502, the feature results obtained in S501 in stage 1 are input into stage 2, aiming at further extracting deeper features (advanced semantic features). In the stage 2, the number of tokens (feature resolution) is further reduced and the width of tokens (feature dimension) is increased through the 3D atrous convolution layer, which makes tokens have the ability to represent more and more complex visual patterns in an increasing spatial range. The obtained feature results are passed through the N2 layer mobile convolution vision Transformer module to further extract the local features in the hyperspectral image block and the global features of the whole image. It should be noted that the structure of this mobile convolution vision Transformer module is the same as that of the mobile convolution vision Transformer module in stage 1, and the process is basically the same, but the stack number N of the Transformer encoder is different, and the specific structure is shown in FIG. 5.

Figure 6:
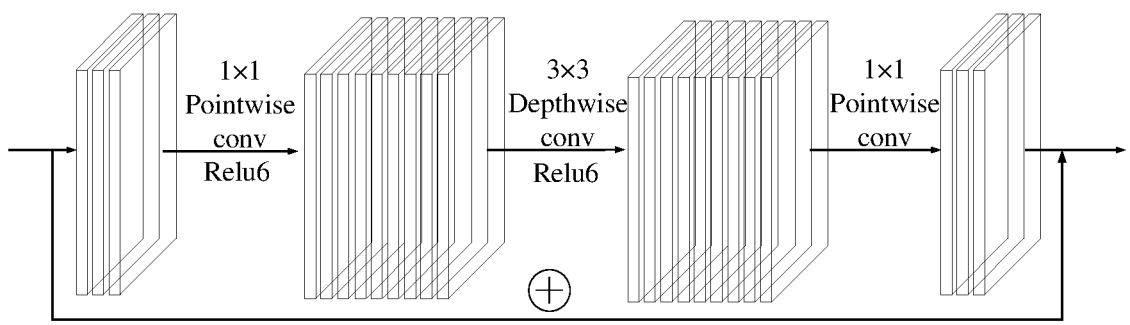
FIG. 6 is a schematic diagram of an reverse residual structure of an embodiment of the present application.

S503, the feature results obtained in S502 into the inverse residual structure in stage 3 (the structure is shown in FIG. 6), which may reduce the number of parameters brought by 3D convolution and realize the balance between data volume and extraction efficiency.

Then a classification mark is artificially added to the obtained feature vector for the final classification.

Figure 3C:
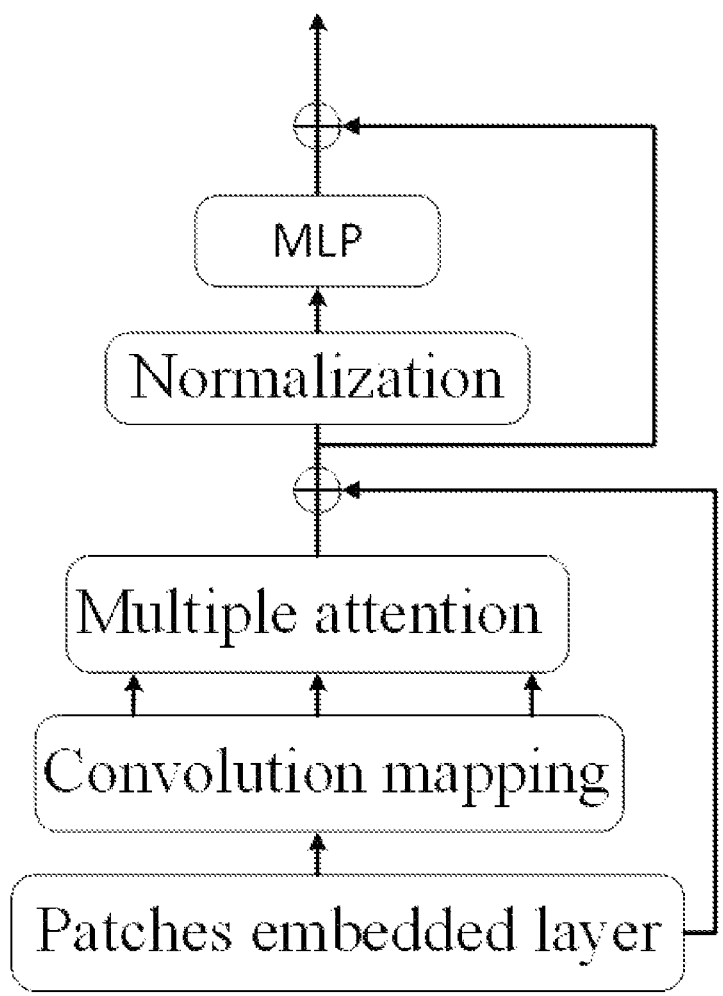
FIG. 3C is a convolutional vision Transformer encoder of a schematic structural diagram of a grassland vegetation classification model according to an embodiment of the present application.

After the classification label is added, the obtained feature vector is input into the convolutional vision Transformer encoder, and the structure is shown in FIG. 3C. It is worth noting that this layer uses depth separable convolution instead of linear mapping in standard Transformer encoder.

Finally, the output results with classification marks use Classification layer (MLP Head) to predict the output categories, and finally get the classification results.

After the grassland vegetation classification model is well trained, the evaluation index of the classification result of the deep learning model is constructed, and three precision indexes, namely the overall accuracy (OA), the average accuracy (AA) and Kappa coefficient, are used to verify the quality of the training model and further verify the classification of vegetation by the model.

Embodiment 2

In order to further evaluate the classification effect and performance of the model method of the application, a vegetation index-mobile 3D atrous convolution vision transformer (VI-MDACvT) model is compared with the benchmark model, such as mobile 3D convolution vision Transformer (MDvT), adding only the vegetation index-feature extraction module in the benchmark model (VI-MDvT), and adding only 3D atrous convolution module in the benchmark model (MDACvT), three-dimensional Convolutional Neural Network (3D-CNN) and Vision Transformer (ViT) model. Meanwhile, in order to ensure fairness, all experiments adopt the same pretreatment method and are carried out in the same experimental environment, and still use the same sample data to classify and identify grassland vegetation species in the study area, and the classification results are shown in Table 2.

TABLE 2

| Classification method | OA/% | AA/% | Kappa/% |
|---|---|---|---|
| 3D-CNN | 95.52 | 88.69 | 93.72 |
| ViT | 97.00 | 94.00 | 95.80 |
| MDvT | 97.61 | 94.48 | 96.65 |
| VI-MDvT | 97.86 | 94.68 | 96.87 |
| MDACvT | 98.03 | 94.48 | 97.61 |
| VI-MDACvT | 98.48 | 95.93 | 97.87 |

According to this embodiment, the technology of the application has high classification accuracy and good effect on grassland vegetation species, and may accurately identify the spatial distribution of each vegetation species, which is more consistent with the spatial distribution of actual ground objects.

Embodiment 3

Figure 7:
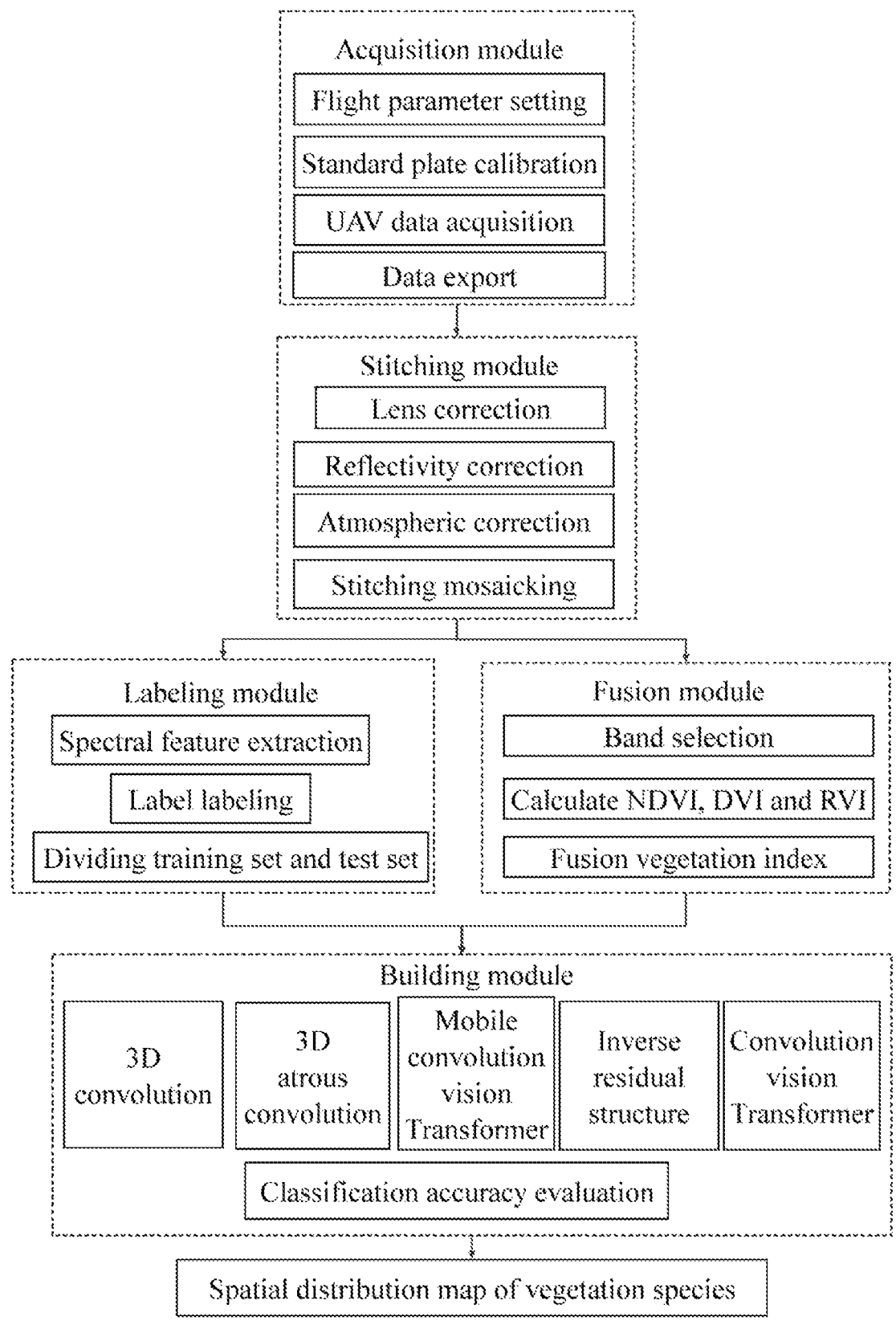
FIG. 7 is a schematic diagram of a system structure of an embodiment of the present application.

As shown in FIG. 7, this embodiment also provides a classification system of UAV hyperspectral vegetation species, which includes an acquisition module, a stitching module, a labeling module, a fusion module and a construction module; the acquisition module is used for obtaining hyperspectral images by using the UAV; the stitching module is used for performing a preprocessing and a stitching mosaicking on the hyperspectral images to obtain hyperspectral orthoimages; the labeling module is used for labeling the hyperspectral orthoimages to obtain a label data set; the fusion module is used for performing a vegetation index fusion on the hyperspectral orthoimages to obtain vegetation index-hyperspectral orthoimages; and the construction module is used for constructing a grassland vegetation classification model based on the vegetation index-hyperspectral orthoimages and the label data set, and completing a vegetation species classification by using the grassland vegetation classification model.

How the present application may solve the technical problems in real life will be explained in detail in combination with this embodiment.

Firstly, the acquisition module is used to obtain the hyperspectral images of UAV.

In this embodiment, hyperspectral images are collected by a UAV equipped with a hyperspectral camera. In this embodiment, the UAV is DJI UAV M600 PRO, which is an electric six-rotor aircraft powered by six detachable batteries. The maximum load is 6 kg, the maximum durability under this load is about 16 min, and the maximum flight speed is 65 km/h. The hyperspectral camera is a push-broom hyperspectral imager Gaiasky-mini2-vn. Its spectral wavelength range is 400-1000 nm, spectral resolution is 3.5 nm, and the number of spectral channels is 176. The focal length of the lens is 23 mm, the transverse field of view angle is 21.5°, and the total weight is 1.5 kg. The spatial dimension of each acquired image is 960 pixels×1040 pixels, and the image format is .raw, and each image may be used directly.

According to the vegetation growth and climate characteristics of alpine grassland in the study area, data were collected. Firstly, the hyperspectral data of UAV is collected. 10:00 and 14:00 is chose, and when there is no wind to breeze, clear and cloudless, or when the cloud amount is less than 2%, so as to ensure sufficient illumination during the collection period and few shadows in the collected aerial photos. Before obtaining images, multiple ground control points are set, and each ground control point will place a 40 cm×60 cm positioning signboard for subsequent ground data investigation, which may accurately locate on airborne hyperspectral images. A 1 m×1 m ground quadrats of vegetation communities is set near each ground control point. Before and after each flight, the imaging spectrometer is calibrated by the standard plate to measure the correct exposure value. Based on the accurate extraction of community species on the scale of quadrat, the design of flying height and sample area size may consider the battery life of UAV, PTZ and hyperspectral instrument. The flying height of the UAV is set to 50 m, the quadrat size is 50×50 m, the image heading overlap rate and lateral overlap rate are set to 80% and 75% respectively, and the spatial resolution of the obtained remote sensing image is about 1.0-1.5 cm.

After that, the stitching module performs a preprocessing and a stitching mosaicking on the hyperspectral images to obtain hyperspectral orthoimages.

The preprocessing of airborne hyperspectral remote sensing image is carried out by SpectraVIEW software, including lens calibration, reflectivity calibration and atmospheric calibration, and the preprocessed single-scene hyperspectral images are obtained. Lens calibration: the original data is calibrated by selecting background data and correction data to eliminate or reduce lens distortion and make up for common lens optical defects; reflectivity calibration: through the calibration of dark background and whiteboard data taken before the flight of the UAV, burrs caused by many noises (instrument noise, environmental noise, etc.) in the response curve are eliminated; atmospheric calibration: the process of removing the influence of clouds and aerosols on data, and obtaining the true reflectivity of the surface. Standard gray cloth is used as the reference for atmospheric calibration, and 40% and 60% standard gray cloth close to the reflectivity of grassland vegetation are used. The overall collection process is shown in FIG. 2.

The preprocessed images are imported into the stitching software SpecStitcher, and the flying height (50 m) of the UAV is input when obtaining the images, and some abnormal images are eliminated manually; after that, the stitching parameters are set several times and the effect is previewed until the stitching result reaches the expectation. Finally, the position correction and full-band stitching of the images are carried out to generate the hyperspectral orthoimage of the research area.

The labeling module labels the hyperspectral orthoimages to obtain a label data set.

In order to obtain the real data of vegetation distribution in alpine grassland in the study area, a field ground investigation was carried out while the UAV collected data. Field ground investigation includes recording the name of vegetation species, vegetation height and coverage in the quadrat, and shooting the visible light image of vegetation canopy with a camera. In this embodiment, *Stipa purpurea* Griseb., *Leontopodium pusillum* (Beauverd) Hand.-Mazz., *Artemisia nanschanica* Krasch. and *Carex moorcroftii* Falc. ex Boott are selected as the research objects. On the basis of extensive ground investigation, combined with visual interpretation, hyperspectral orthoimages are labeled. The specific process includes: the hyperspectral orthoimages are input into Envi software, and the spectral features of the hyperspectral orthoimage are extracted in Envi software, and the "region of interest (ROI)" of different grassland vegetation species is labeled by manual visual interpretation according to the spectral features of different vegetation species in Envi software to obtain the ROI of the image; then the labeled ROI is converted into a label grid file. After labeling, label data is divided into a training set and a test set.

In this embodiment, there are 61,587 data samples in the data set, including 21,251 *Stipa purpurea* Griseb., 5,254 *Artemisia nanschanica* Krasch., 14,985 *Leontopodium pusillum* (Beauverd) Hand.-Mazz., 1,889 *Carex moorcroftii* Falc. ex Boott, and 18,208 bare soil and others. Before the model training, 8,000 sample points are randomly selected from all pixels in all categories as the training set, and the remaining pixels are used as the test set. For categories with less than 8,000 sample points, half of the existing sample points are used as the training set, and the other half as the test set. There are 27,571 samples in the training set and 34,016 samples in the test set.

The fusion module performs vegetation index fusion on the hyperspectral orthoimage to obtain the vegetation index-hyperspectral orthoimages.

Firstly, infrared and near-infrared bands are selected for hyperspectral orthoimages, and then normalized differential vegetation index (NDVI), differential vegetation index (DVI) and ratio vegetation index (RVI) values are calculated according to the selected infrared and near-infrared bands. The calculation formulas are shown in Table 3, and finally the corresponding grid images of NDVI, DVI and RVI are obtained.

TABLE 3

| Vegetation index type Calculation formulas | Calculation formulas |
| --- | --- |
| Normalized differential vegetation index (NDVI) | $\dfrac{\rho_{NIR} - \rho_{RED}}{\rho_{NIR} + \rho_{RED}}$ |
| Differential vegetation index (DVI) | $\rho_{NIR} + \rho_{RED}$ |
| Ratio vegetation index (RVI) | $\dfrac{\rho_{NIR}}{\rho_{RED}}$ |

In the table, $\rho_{RED}$ is the infrared band and $\rho_{NIR}$ is the near-infrared band (in this example, the infrared band is 650.8 nm and the near-infrared band is 861.7 nm).

Then, the obtained NDVI, DVI and RVI grid images are fused into the bands of hyperspectral orthoimages in the form of bands, and the vegetation index-hyperspectral orthoimages are obtained. The process of fusing vegetation index is shown in FIG. 3A.

Finally, the building module builds a grassland vegetation classification model based on the vegetation index-hyperspectral orthoimages and the label data set, and uses the grassland vegetation classification model to complete the vegetation species classification.

In this embodiment, the grassland vegetation classification model is a mobile 3D atrous convolution vision Transformer, which draws lessons from the multi-level structure design of convolutional neural network, as shown in FIG. 3B, and the model is a multi-level hierarchical structure, which consists of three stages and five modules, including: 3D convolution, 3D atrous convolution, mobile convolution vision Transformer, reverse residual structure and convolution vision Transformer; where stage 1 includes 3D convolution, 3D atrous convolution and mobile convolution vision Transformer module, stage 2 includes 3D atrous convolution and mobile convolution vision Transformer module, and stage 3 includes reverse residual structure and convolution vision Transformer module.

The specific process of model construction includes:

S501, the vegetation index-hyperspectral orthoimages obtained in the above process and the label training set are input into the model for training. First, the input 3D Patches are downsampled through the 3D convolution of stage 1 in FIG. 3B, and the structure of the 3D convolution is shown in FIG. 4A.

After that, the results obtained by the 3D convolution operation are passed through the 3D atrous convolution layer, and the receptive field of the convolution kernel is expanded under the condition of retaining more information. The structure of the 3D atrous convolution layer is shown in FIG. 4B.

Finally, the feature map obtained by 3D atrous convolution operation passes through N1 layer mobile convolution vision Transformer module (as shown in FIG. 5), aiming at accelerating the modeling of local and global information of input tensor. In the mobile convolution vision Transformer module, the ordinary 3D volume integral is decomposed into depth convolution and point convolution through depth separable convolution. The feature map is firstly used for local feature modeling through 3×3 depth convolution, then the tensor is projected into a high-dimensional space by using the linear combination of 1×1 point convolution learning input channels, and then the global long-distance dependent features are extracted through the Transformer module with the "expand-Transformer encoder-collapse" mechanism. This structure is helpful to reduce the number of parameters in the self-attention mechanism. Then the number of channels is adjusted back to the original size by 1×1 point convolution. Finally, with the help of shortcut residual difference branch, the feature map and the original input map are simply connected along the channel direction, and these features are fused by 3×3 depth convolution to obtain the final global feature output.

S502, the feature results obtained in S501 in stage 1 are input into stage 2, aiming at further extracting deeper features (advanced semantic features). In the stage 2, the number of tokens (feature resolution) is further reduced and the width of tokens (feature dimension) is increased through the 3D atrous convolution layer, which makes tokens have the ability to represent more and more complex visual patterns in an increasing spatial range. The obtained feature results are passed through the N2 layer mobile convolution vision Transformer module to further extract the local features in the hyperspectral image block and the global features of the whole image. It should be noted that the structure of this mobile convolution vision Transformer module is the same as that of the mobile convolution vision Transformer module in stage 1, and the process is basically the same, but the stack number N of the Transformer encoder is different, and the specific structure is shown in FIG. 5.

S503, the feature results obtained in S502 into the inverse residual structure in stage 3 (the structure is shown in FIG. 6), which may reduce the number of parameters brought by 3D convolution and realize the balance between data volume and extraction efficiency.

Then a classification mark is artificially added to the obtained feature vector for the final classification.

After the classification label is added, the obtained feature vector is input into the convolutional vision Transformer encoder, and the structure is shown in FIG. 3C. It is worth noting that this layer uses depth separable convolution instead of linear mapping in standard Transformer encoder.

Finally, the output results with classification marks use Classification layer (MLP Head) to predict the output categories, and finally get the classification results.

After the grassland vegetation classification model is well trained, the evaluation index of the classification result of the deep learning model is constructed, and three precision indexes, namely the overall accuracy (OA), the average accuracy (AA) and Kappa coefficient, are used to verify the quality of the training model and further verify the classification of vegetation by the model.

The above-mentioned embodiment is only a description of the preferred mode of the application, and does not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A classification method of UAV hyperspectral vegetation species based on a deep learning, comprising following steps:
   collecting hyperspectral images of vegetations in a sample area by a UAV and an airborne hyperspectral instrument;
   preprocessing collected hyperspectral images to obtain preprocessed images, and performing a stitching mosaicking preprocessing on the preprocessed images to obtain hyperspectral orthoimages;
   labeling the hyperspectral orthoimages to obtain a label data set; wherein a method for obtaining the label data set comprises: firstly, importing the hyperspectral orthoimages into a label labeling software, extracting spectral features of the hyperspectral orthoimages, and performing an artificial visual interpretation according to the spectral features of different vegetation species in the label labeling software and labeling the different vegetation species to obtain a region of interest of each of the vegetation species in the images; then, converting a labeled region of interest into a label grid file; finally, after the label grid file is obtained, dividing the label grid file into a training set and a test set;
   performing a vegetation index fusion on the hyperspectral orthoimages to obtain vegetation index-hyperspectral orthoimages; wherein a method for obtaining the vegetation index-hyperspectral orthoimages comprises: firstly, selecting infrared and near-infrared bands for the hyperspectral orthoimages, and then calculating a normalized differential vegetation index value, a difference vegetation index value and a ratio vegetation index value for the hyperspectral orthoimage according to the selected infrared and near-infrared bands to obtain corresponding grid images respectively; then, fusing obtained grid images into bands of the hyperspectral orthoimages in a form of band to obtain the vegetation index-hyperspectral orthoimages; and
   constructing a grassland vegetation classification model based on the vegetation index-hyperspectral orthoimages and the label data set, and completing a vegetation species classification by using the grassland vegetation classification model; wherein the grassland vegetation classification model comprises a mobile 3D atrous convolution vision Transformer model, wherein the mobile 3D atrous convolution vision Transformer model has a multi-level structure design and comprises three stages and five modules, comprising a 3D convolution, a 3D atrous convolution, a mobile convolution vision Transformer, a reverse residual structure and a convolution vision Transformer; wherein stage 1 comprises the 3D convolution, the 3D atrous convolution and a mobile convolution vision Transformer module, stage 2 comprises the 3D atrous convolution and the mobile convolution vision Transformer module, and stage 3 comprises the reverse residual structure and a convolution vision Transformer module.

2. The classification method of the UAV hyperspectral vegetation species based on the deep learning according to claim 1, wherein a preprocessing method comprises a lens calibration, a reflectivity calibration and an atmospheric calibration.

3. The classification method of the UAV hyperspectral vegetation species based on the deep learning according to claim 1, wherein a method for obtaining the hyperspectral orthoimages comprises: importing the preprocessed images into a mosaic software, inputting a flying height of a UAV when obtaining images, and manually eliminating abnormal images; then setting stitching parameters and previewing an effect until stitching results reach an expectation; finally, performing a full-band stitching mosaicking of the images to generate the hyperspectral orthoimages of a research area.

4. A classification system of UAV hyperspectral vegetation species based on a deep learning, used to realize the method of claim 1, comprising an acquisition module, a stitching module, a labeling module, a fusion module and a construction module;

the acquisition module is used for obtaining hyperspectral images by using the UAV;

the stitching module is used for performing a preprocessing and a stitching mosaicking on the hyperspectral images to obtain hyperspectral orthoimages;

the labeling module is used for labeling the hyperspectral orthoimages to obtain a label data set;

wherein a process of obtaining the label data set comprises: firstly, importing the hyperspectral orthoimages into a label labeling software, extracting spectral features of the hyperspectral orthoimages, and performing an artificial visual interpretation according to the spectral features of different vegetation species in the label labeling software and labeling the different vegetation species to obtain a region of interest of each of the vegetation species in the images; then, converting a labeled region of interest into a label grid file; finally, after the label grid file is obtained, dividing the label grid file into a training set and a test set;

the fusion module is used for performing a vegetation index fusion on the hyperspectral orthoimages to obtain vegetation index-hyperspectral orthoimages; wherein a process of obtaining the vegetation index-hyperspectral orthoimages comprises: firstly, selecting infrared and near-infrared bands for the hyperspectral orthoimages, and then calculating a normalized differential vegetation index value, a difference vegetation index value and a ratio vegetation index value for the hyperspectral orthoimage according to the selected infrared and near-infrared bands to obtain corresponding grid images respectively; then, fusing obtained grid images into bands of the hyperspectral orthoimages in a form of band to obtain the vegetation index-hyperspectral orthoimages; and the construction module is used for constructing a grassland vegetation classification model based on the vegetation index-hyperspectral orthoimages and the label data set, and completing a vegetation species classification by using the grassland vegetation classification model; wherein the grassland vegetation classification model comprises a mobile 3D atrous convolution vision Transformer model, wherein the mobile 3D atrous convolution vision Transformer model has a multi-level structure design and comprises three stages and five modules, comprising a 3D convolution, a 3D atrous convolution, a mobile convolution vision Transformer, a reverse residual structure and a convolution vision Transformer; wherein stage 1 comprises the 3D convolution, the 3D atrous convolution and a mobile convolution vision Transformer module, stage 2 comprises the 3D atrous convolution and the mobile convolution vision Transformer module, and stage 3 comprises the reverse residual structure and a convolution vision Transformer module.

* * * * *